Patented Sept. 4, 1928.

1,682,913

UNITED STATES PATENT OFFICE.

FRANK E. LAYMON AND LINWOOD T. RICHARDSON, OF MILWAUKEE, WISCONSIN, ASSIGNORS TO THE CUTLER-HAMMER MFG. CO., OF MILWAUKEE, WISCONSIN, A CORPORATION OF WISCONSIN.

SOUND-RECORD COMPOSITION.

No Drawing. Application filed September 13, 1923. Serial No. 662,559.

This invention relates to improvements in sound records, also to improved materials and processes for production thereof.

Bodies, herein called records, having a surface portion thereof permanently impressed with a groove or trace corresponding to a definite sound or similar wave may be produced by moulding the desired wave, trace, groove or the like upon or within the surface of a plastic comprising a filler and a resinous or other cementitious binder therefor, and thereafter fixing the resultant impression by hardening the impressed surface.

Thus the qualities of a plastic material required to adapt the same to the sound reproducing art include that of ready convertibility from a state of high plasticity for moulding into a state of great hardness, solidity, and durability for reproduction.

This requirement is perhaps best fulfilled by a material which at ordinary temperatures possesses adequate hardness and the like for reproduction and which upon moderate heating is adapted to become sufficiently plastic to enable moulding with the high degree of accuracy required in the sound reproducing art.

Such a thermoplastic material moreover must not be susceptible to any material degree of permanent induration, at least during the time within which the same is necessarily subjected to elevated temperatures preparatory to moulding.

On the other hand it is exceedingly desirable that the material be permanently thermoplastic, thus enabling reclamation and repressing of the relatively high percentage of waste material including complete but more or less imperfect records, which is necessarily involved in maintenance of the highest quality of the commercial product.

Heretofore, great difficulty and serious disadvantage and loss have been encountered as a result of employment in the sound reproducing art of materials lacking in certain of the foregoing desirable characteristics.

Again, the plastic must not contain or produce during treatment any substance tending either by chemical of mechanical action to hasten deterioration of the forming die or to promote sticking of the plastic thereto, whereas the working surface of the record die necessarily carries, in a negative or reverse relation, the exceedingly fine and delicate grooves and ridges conforming to the shape of the sound wave to be reproduced, the die surface being ordinarily composed of electrodeposited nickel or the like and being thus peculiarly susceptible both to chemical attack and to mechanical abrasion or wear.

The present invention has among its objects that of providing improved materials, and particularly binders, adapted to the sound reproducing art and possesing therefor the aforementioned necessary and desirable characteristics among others.

Another object is that of providing commercially useful records comprising such materials.

Another object is that of providing advantageous methods of producing and treating such materials for ultimate production of such records.

Other objects and advantages will hereinafter appear.

As a result of protracted experimentation, we have found that resins of the sulphur type, that is to say, resins produced from materials comprising an organic body and a substance capable of furnishing a quantity of sulphur or its equivalent, when in a state of induration suitable for hot moulding possess properties including most of those aforedescribed, tending to adapt the same to the sound reproducing art and to render the same for such purpose superior to the binders heretofore employed. As examples of resins of the "sulphur type" I may mention the so-called phenol-sulphur chloride and naphthalene-sulphur chloride resins, more specifically referred to hereinafter; whereas it will be understood that such term as used herein and in the claims is intended to include various other similar or analogous resins comprising an organic substance and sulphur (or a substantially equivalent substance from the sixth group of the periodic system, such as selenium, tellurium, etc.); and the term "sulphur" is intended to include the aforementioned substantially equivalent substances or elements.

Thus, in the production of records from stock comprising certain of the natural resin binders, great difficulty is encountered in effecting the necessary preheating and plasticization of the sheeted stock without permanent induration thereof to such an extent as to prevent successful pressing. This results from the fact that such natural resins tend to undergo permanent induration quite rapidly when heated, whereas the time within which the same may safely be subjected to or maintained at the proper moulding temperature is in general barely sufficient or even insufficient to enable performance of the necessary steps precedent to actual pressing, whereby the maximum attainable speed and skill in manipulation of the material are incapable of preventing considerable loss due to premature induration or "burning."

The herein contemplated materials, on the other hand, are not, in general, subject to impairment of their pressing qualities by reason of premature permanent induration when subjected to prolonged heating at or even above their optimum moulding temperatures. This characteristic, among others, tends to render the use of such materials for present purposes highly advantageous, in that wastage of material as a result of premature induration is practically eliminated whereas the degree of care and skill required for successful production of records is greatly reduced and the material of any imperfectly pressed or otherwise defective records may be reclaimed and represed. The present materials, moreover, may be produced of uniform plasticity and the like, and at reduced cost.

While such resins of the sulphur type thus possess properties tending to adapt the same to use with peculiar advantages in the sound reproducting art, nevertheless the same as ordinarily produced and treated are likely to contain, or to produce during treatment preparatory to moulding, traces or even appreciable quantities of substances tending to promote sticking of the material to the die and even tending in extreme cases to hasten deterioration of the die itself as a result of increased wear or possible chemical attack.

More specifically such resins are ordinarily produced synthetically from materials which may include on the one hand a hydrocarbon or other organic body, usually containing more or less loosely combined hydrogen, and on the other hand a substance containing a halogen and an element of the sulphur type, such for example, as a chloride of sulphur.

These materials thus comprise or contain the constituents of both the halide and sulphide of hydrogen, whereas the processes of production of the resins are in general such, that, in the absence of special precautions, traces or even appreciable quantities of such compounds may tend to exist in the product, the constituents of such compounds being either in a state of combination with one another or else so lossely combined or associated with other elements or groups as to be capable of liberation therefrom and combination with one another upon subjection of the product to certain industrial treatments, such for example, as strong heating.

These compounds, and possibly others, which potentially exist in the resin when heated preparatory to moulding, tend to promote sticking of the material to the die and also in certain cases to hasten deterioration of the die in service, for which reasons, removal or fixation of such compounds or constituents thereof is highly desirable and important.

Following extensive research, it has been found possible by processes to be later described, to overcome all of the aforementined undesirable properties or tendencies of resins of the sulphur type, thereby more fully and completely adapting the same to the sound reproducing art.

Thus, for example, it has been found that if a resin produced from an organic body and a substance capable of furnishing sulphur and a halogen, be heated at 250° to 400° F. for about one-half hour together with about ten percent of its weight of white lead comprising a mixture of carbonate and hydroxide of lead, the resin is rendered innocuous chemically toward the polished nickel die and sticking of the former to the latter as a result of the causes aforementioned is eliminated.

As typical of the herein contemplated methods of producing records, approximately 40 parts of a resin of the sulphur type, preferably treated as aforedescribed for fixation of deleterious substances or compounds, may be thoroughly incorporated, preferably upon heated rolls, with 60 parts of a suitable filler material, such for example, as one of the known filler compounds comprising suitable proportions of rotten stone or an equivalent, flock, coloring matter and the like. After such incorporation, the composite material, preferably in the form of thin sheets, is further heated upon a steam table or the like to a state of plasticity suitable for moulding, the actual temperatures employed being somewhat dissimilar for the different binder and filler combinations and proportions but being in general from 300° to 350° F.

The material is thereafter subjected to a quick moulding operation in heated dies, carrying in reverse the desired sound trace, wave, groove or the like.

The formed record may be quickly ejected from the die without requiring heat induration, cooling of the material within the die being advantageous as an aid in ejection and also in expediting setting of the formed record.

Records produced as aforedescribed are characterized by excellent finish, together with strength, hardness, durability, and other desirable properties.

Among the resins of the sulphur type which may be thus employed, may be mentioned as examples those produced from the following or equivalent substances in approximately the proportions stated:

(a) 100 parts of naphthalene, 100 to 150 parts of sulphur monochloride together with a small portion or trace of iron or other suitable catalytic or activating agent, 150 to 200 parts of sulphur.

(b) 100 parts of naphthalene, 150 parts of sulphur monochloride together with a small portion of iron or other activating agent.

(c) 100 parts of a phenol, 200 parts of a chloride of sulphur, 75 parts of sulphur.

(d) 100 parts of a phenol, 210 parts of a chloride of sulphur.

These and numerous other resins of the sulphur type may in accordance with the present teaching be employed advantageously in production of accurate and permanent sound records having commercial value and utility.

What we claim as new and desire to secure by Letters Patent is:

1. A sound record produced from material comprising approximately ten parts by weight of a resin of the sulphur type treated by incorporation therein of approximately one part by weight of white lead, and heating at a temperature above 300° F. for a period of approximately one-half hour.

2. The process of treating a resin of the sulphur type, to adapt the same to the sound reproducing art, which comprises incorporating in approximately ten parts of the resin approximately one part of white lead, and heating the supplemented resin above 300° F.

3. The process of producing sound records, which comprises incorporating in a resin of the sulphur type a quantity of white lead, heating the mixture to promote fixation by said white lead of potentially active constituents of halides and sulphides in said resin, at a given stage incorporating a suitable filler, and hot moulding the product to impress thereon a sound trace.

4. The process of producing sound records, which comprises incorporating in a resin of the sulphur type, a quantity of white lead, heating the mixture to promote fixation by said white lead of potentially active constituents of halides and sulphides in said resin, at a given stage incorporating a suitable filler, and hot moulding the product to impress thereon a sound trace, maintaining thermoplasticity of the product.

5. A sound record including a filler and a binder therefor comprising resin produced from materials including an organic body, a halogen derivative of sulphur, and a quantity of white lead.

6. A sound record including a filler and a binder therefore comprising a resin which is substantially innocuous chemically toward nickel, said resin having been produced from materials including an organic body, sulphur, a halogen compound of sulphur, and white lead.

7. A sound record including binder material comprising a resin produced from materials including naphthalene, a halogen derivative of sulphur, and sulphur, said resin having incorporated therewith a quantity of white lead to render the same innocuous chemically toward nickel.

8. A sound record including binder material comprising a resin produced from materials including naphthalene, a chloride of sulphur, and sulphur, said resin having incorporated therewith about ten per cent of its weight of white lead to render the same innocuous chemically toward nickel when subjected to hot moulding temperatures.

9. A sound record produced from material comprising a resin of the sulphur type, containing potentially active constituents of a halide and sulphide of hydrogen, treated with white lead under influence of heat to render same innocuous chemically toward nickel.

10. The process of treating a resin of the sulphur type to adapt the same to the sound reproducing art which comprises incorporating in the resin a quantity of white lead adapted to act thereon for rendering the same innocuous toward nickel.

11. The process of producing sound records, which comprises subjecting a resin of the sulphur type to treatment with a mixture of carbonate of lead and hydroxide of lead for fixation of potentially active constituents of a halide of hydrogen, and hot molding material comprising the resin so treated to impress thereon a sound trace.

12. The process of producing sound records, which comprises subjecting a resin of the sulphur type to treatment including incorporation therewith of a quantity of white lead for fixation of potentially active constituents of a halide of hydrogen, and hot molding material comprising the resin so treated to impress thereon a sound trace, while maintaing thermoplasticity of the product.

13. The process of producing commercially useful sound records, which comprises hot moulding material comprising a resin produced from materials comprising substantially 100 parts of naphthalene, 100 to 150 parts of a chloride of sulphur, and 150 to 200 parts of sulphur, to impress thereon a sound trace, while maintaining thermoplasticity of the product, said resin having incorporated therewith about ten per cent of its weight of white lead for the purpose specified.

14. A sound record including binder material comprising a resin produced from materials including substantially 100 parts of naphthalene, 100 to 150 parts of a chloride of sulphur, and 150 to 200 parts of sulphur, said resin having added thereto approximately ten per cent by weight of white lead to render the same innocuous chemically toward nickel when subjected to hot molding temperatures.

In witness whereof, we have hereunto subscribed our names.

FRANK E. LAYMAN.
LINWOOD T. RICHARDSON.